(12) United States Patent
Cadieux et al.

(10) Patent No.: US 7,165,192 B1
(45) Date of Patent: Jan. 16, 2007

(54) FAULT ISOLATION IN LARGE NETWORKS

(75) Inventors: Christian Cadieux, Louisville, CO (US); Gavin G. Gibson, Washington, CO (US)

(73) Assignee: Sun Microsystems, Inc., Santa Clara, CA (US)

( * ) Notice: Subject to any disclaimer, the term of this patent is extended or adjusted under 35 U.S.C. 154(b) by 479 days.

(21) Appl. No.: 10/741,399

(22) Filed: Dec. 19, 2003

(51) Int. Cl.
*G06F 11/00* (2006.01)

(52) U.S. Cl. ...................................................... 714/43
(58) Field of Classification Search ................. 714/43, 714/47, 57, 25, 48, 49, 31; 709/220, 221, 709/249
See application file for complete search history.

(56) References Cited

U.S. PATENT DOCUMENTS

| | | | | |
|---|---|---|---|---|
| 5,416,777 A | * | 5/1995 | Kirkham | 370/449 |
| 5,528,759 A | * | 6/1996 | Moore | 709/224 |
| 5,537,653 A | * | 7/1996 | Bianchini, Jr. | 714/25 |
| 5,627,766 A | * | 5/1997 | Beaven | 702/122 |
| 6,269,452 B1 | * | 7/2001 | Daruwalla et al. | 714/4 |
| 6,549,513 B1 | * | 4/2003 | Chao et al. | 370/227 |
| 6,615,362 B1 | * | 9/2003 | Daruwalla et al. | 714/4 |
| 6,898,430 B1 | * | 5/2005 | Liberti et al. | 455/445 |
| 2001/0039577 A1 | | 11/2001 | Barkai et al. | |
| 2002/0194319 A1 | * | 12/2002 | Ritche | 709/223 |
| 2003/0051195 A1 | | 3/2003 | Bosa et al. | |
| 2003/0081556 A1 | | 5/2003 | Woodall | |
| 2003/0135610 A1 | | 7/2003 | Ch'ng | |
| 2004/0181709 A1 | | 9/2004 | Gibson et al. | |

* cited by examiner

*Primary Examiner*—Nadeem Iqbal
(74) *Attorney, Agent, or Firm*—Lawrence J. Merkel; Meyertons, Hood, Kivlin, Kowert & Goetzel, P.c.

(57) ABSTRACT

In some embodiments, a computer accessible medium comprises a plurality of instructions which, when executed, probe nodes in a network to determine if one or more nodes are experiencing any events indicative of a fault. The nodes are probed in a sequence. The instructions, when executed, in response to receiving a first alert transmitted by a first node in the network asynchronous to the probes performed according to the sequence, probe one or more neighbor nodes of the first node. In some other embodiments, the instructions, when executed, in response to receiving a first alert transmitted by a first node in the network asynchronous to the probes performed according to the sequence, interrupt probing according to the sequence to probe at least the first node.

19 Claims, 6 Drawing Sheets

FAULT ISOLATION IN LARGE NETWORKS

BACKGROUND OF THE INVENTION

1. Field of the Invention

This invention is related to the field of fault isolation in networks of devices.

2. Description of the Related Art

Networks generally connect a set of devices (or nodes). For example, various computer networks (e.g. local area networks (LANs), wide area networks (WANs), metropolitan area networks (WANs), wireless networks, intranets, extranets, the Internet, etc.) connect various computer systems. Storage area networks (SANs) connect various storage devices to a set of hosts.

The devices in a network are prone to faults of various kinds. Furthermore, a given fault in one device may cause other devices that have some sort of relationship to the device to also experience a fault. Still further, an environmental event or other factor (e.g. temperature in a room in which a device or devices are located, or power supply to the devices) may cause faults to occur. Isolating the many faults, correlating the faults, and determine the root cause of the faults is often a complicated task.

Some approaches to the problem of fault isolation rely on the devices to report faults to a monitor. However, there may be faults which the device cannot report (e.g. the severity of the fault may prevent the device from communicating, such as the power to the device going off).

Other approaches to the problem of fault isolation actively contact the devices in the network to attempt to detect devices that have experienced a fault. However, such approaches do not scale well to large numbers of devices. For example, if a device experiences a fault soon after being contacted, the fault will not be detected until the next time that device is contacted.

SUMMARY OF THE INVENTION

In one embodiment, a computer accessible medium is contemplated that comprises a plurality of instructions which, when executed, probe nodes in a network to determine if one or more nodes are experiencing any events indicative of a fault. The nodes are probed in a sequence. The instructions, when executed, in response to receiving a first alert transmitted by a first node in the network asynchronous to the probes performed according to the sequence, probe one or more neighbor nodes of the first node. In other embodiments, the instructions, when executed, in response to receiving a first alert transmitted by a first node in the network asynchronous to the probes performed according to the sequence, interrupt probing according to the sequence to probe at least the first node.

In another embodiment, a computer system comprises a probe agent and an inspector. The probe agent is configured to probe nodes in a network in a sequence to determine if the nodes are experiencing an event or events indicative of a fault. The inspector is configured, in response to receiving a first alert transmitted by a first node in the network asynchronous to the probing by the probe agent, to identify one or more neighbor nodes of the first node and to cause the probe agent to probe the one or more neighbor nodes independent of the sequence.

In still another embodiment, an apparatus comprises a plurality of nodes coupled to a computer system. The computer system is configured to probe the plurality of nodes in a sequence to determine if any nodes are experiencing a fault or an event indicative of a fault. At least a first node is configured to transmit a first alert to the computer system asynchronous to the probing. The computer system, in response to the first alert, is configured to probe one or more neighbor nodes of the first node independent of the sequence.

BRIEF DESCRIPTION OF THE DRAWINGS

The following detailed description makes reference to the accompanying drawings, which are now briefly described.

Figure 1:
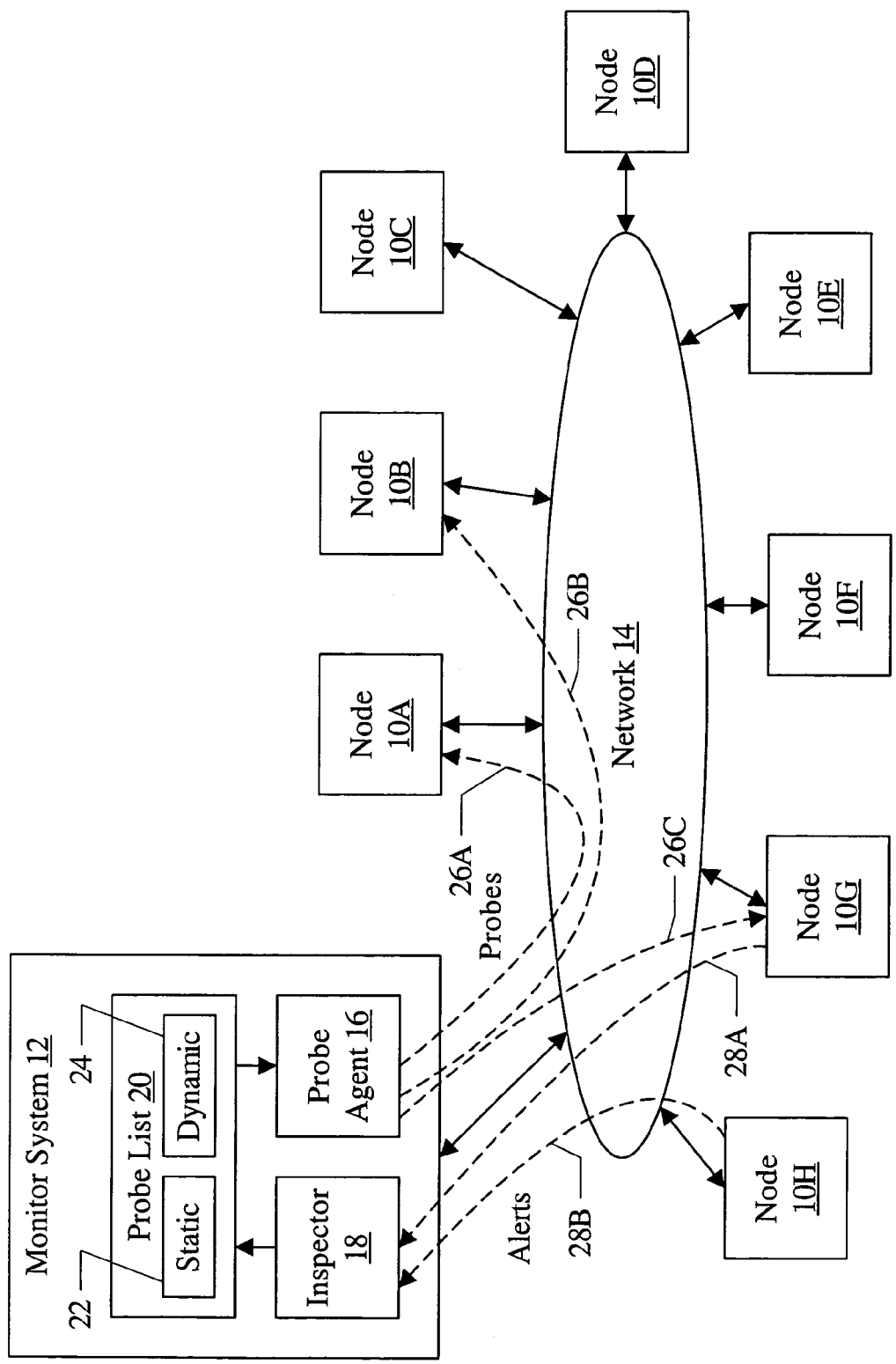
FIG. 1 is a block diagram of one embodiment of a monitor system and a plurality of nodes coupled to a network.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Turning now to FIG. 1, a block diagram of one embodiment of a networked system including a plurality of nodes 10A–10H, a monitor system 12, and a network 14 is shown. The nodes 10A–10H and the monitor system 12 are coupled to the network 14. In the illustrated embodiment, the monitor system 12 includes a probe agent 16, an inspector 18, and a probe list 20 (which may include, in the illustrated embodiment, a static probe list 22 and a dynamic probe list 24).

The monitor system 12 may implement a combination of actively probing nodes 10A–10H and receiving alerts from nodes 10A–10H to detect events that may be indicative of a fault. For example, in FIG. 1, probes 26A–26B are illustrated to nodes 10A–10B, and alerts 28A–28B are shown being transmitted by the nodes 10G–10H. As used herein, an "event" may comprise a fault (either a root cause fault or a fault caused by another fault), or any another indication of problematic operation that may subsequently lead to a fault or may be a symptom of a fault. In some cases, a combination of two or more events on a node or nodes may be indicative of a fault. Both probes and alerts are illustrated as being transmitted over the network 14, although sideband signals or other messaging mechanisms may be used in other embodiments.

Probes may be used to detect an event or events in any of the nodes 10A–10H (e.g. for cases in which a fault prevents the node that is experiencing the event from transmitting an alert, or for nodes that may not be designed to transmit alerts). In some embodiments, the probing of nodes may be performed in a predetermined order that includes each node in the networked system. The order may be arbitrary among the nodes. For example, the nodes may be probed in an arbitrary round robin order. The static probe list 22 of the probe list 20 may store the predetermined order for the active probing. In other embodiments, the order may change from time to time (for example, as mentioned below, the order may be changed in response to receiving an alert). Generally, the probing may be performed in any sequence as long as each node is included in the sequence at least once. A sequence may comprise any order for probing the nodes, including fixed (or predetermined orders) and orders that may be changed from time to time.

Alerts may be received from nodes that detect an event asynchronous to the probing of the nodes. The alerts may be transmitted independent of whether or not the nodes transmitting the probes have recently been probed. The alerts are triggered by the nodes detecting the event, rather than by receiving a probe from monitor system 12.

In some embodiments, in response to receiving an alert from a given node 10A–10G (a "suspect node"), the monitor system 12 may interrupt the probing of nodes according to the sequence and may probe the suspect node and/or one or more neighbor nodes of the suspect node. (e.g. the probe 26C in FIG. 1 may be issued in response to the alert 28A). Viewed in another way, probing of the suspect node and/or the neighbor nodes may be independent of the sequence. A "neighbor node" may generally have one or more relationships with the suspect node which may make the neighbor node susceptible to experiencing certain faults/events if the suspect node experiences certain faults/events, and vice versa. Thus, if the suspect node experiences an event (which it reports to the monitor system 12 using an alert), it is possible that the neighbor nodes of the suspect node will also experience an event, or have already experienced an event. By probing the suspect node and/or the neighbor nodes in response to receiving an alert from the suspect node, the monitor system 12 may detect the possibly-related events and may correlate the events to a "root cause", in some embodiments. Additionally, by interrupting the probing according to the sequence to probe the suspect node and neighbor nodes, the monitor system 12 may relatively rapidly complete the process of detecting the events and correlating the events to a "root cause". The "root cause" may be a fault that causes other faults/events to occur.

In some embodiments, the monitor system 12 may also identify a suspect node via probing the suspect node according to the sequence. In such a case, the monitor system 12 may interrupt probing of node according to the sequence to probe the neighbor nodes of the suspect node.

In the illustrated embodiment, the monitor system 12 may update the dynamic probe list 24 with the suspect node and/or the neighbor nodes in response to receiving the alert from the suspect node. The monitor system 12 may then probe the nodes in the dynamic probe list 24. Once the probing is complete, in some embodiments, the monitor system 12 may revert to probing nodes according to the sequence (e.g. the predetermined order of the static probe list 22).

While the illustrated embodiment includes a static probe list 22 and a dynamic probe list 24, other embodiments may implement the probe list 20 in other fashions. For example, the monitor system 12 may update the probe list 20 in response to an alert. The suspect nodes and the neighbor nodes may be added to the probe list, and the addition to the probe list may trigger probing of the suspect nodes and the neighbor nodes. The suspect and neighbor nodes may be added to the end of the probe list 20, or may be inserted at the point in the probe list 20 that the monitor system 12 is currently issuing probes from.

In the illustrated embodiment, the monitor system 12 implements the above functionality in two partitions: one or more inspectors 18 and the probe agent 16. The probe agent 16 may be configured to issue probes (either according to the predetermined order or, if an alert is received, to the suspect node and neighbor nodes). Additionally, the probe agent 16 may be configured to collect the information from the probes, and provide information to a fault management system (not shown in FIG. 1). The fault management system may attempt to take corrective action for the identified faults or inform an administrator if a given fault cannot be automatically corrected by the fault management system.

The inspector 18 may be the receiver of alerts. The inspector 18 may, in response to receiving an alert, update the probe list 20 (e.g. the dynamic probe list 24) to cause the probe agent to probe the suspect node and neighbor nodes. That is, an update of the probe list 20 by the inspector 18 may cause the probe agent 16 to interrupt probing according to the predetermined order and to probe the suspect node and neighbor nodes.

In one embodiment, the inspector 18 and the probe agent 16 may each comprise threads of software instructions executed by a processor or processors in the monitor system 12. In some embodiments, the inspector 18 may be in continuous background execution, similar to a daemon in Unix-type environments, listening for alerts. In other embodiments, the inspector 18 may be scheduled for execution responsive to the monitor system 12 receiving an alert, or may be scheduled for execution periodically to check for any new alerts. In some embodiments, the inspector 18 may read a log file that stores alerts, and alerts may be written into the log file as the alerts are received by the monitor system 12. Thus, growth of the log file may signal that one or more alerts have been received. In some embodiments, the probe agent 16 may be scheduled periodically to probe the agents according to the sequence. The amount of time between schedulings of the probe agent 16 may be varied in various embodiments. In some embodiments, the update of the probe list 20 by the inspector 18 may cause the probe agent 16 to be scheduled (to probe the suspect node and the neighbor nodes).

In some embodiments, the detection of alerts and the probing of suspect nodes and neighbor nodes in response to the alerts may permit the probing of nodes according to the sequence to be scheduled at longer intervals between probe passes, since many faults may be detected through reception of alerts. However, probing the nodes according to the sequence may permit the detection of events that prevent the node that is experiencing the event from reporting the event. For example, a power off event, in which power is suddenly lost to the node, may prevent reporting of the event. A loss of network connectivity may prevent reporting of the event. Other events may be so severe that the node ceases functioning at all, which may also prevent reporting of the event.

While the illustrated embodiment partitions the task into inspector 18 and probe agent 16, other embodiments may not partition the task or may partition the task into more portions. In some embodiments, there may be multiple monitor systems. For example, there may be a monitor system that executes the probe agent 16 (or several monitor systems that execute probe agents 16, each probing different subsets of the nodes 10A–10G) and one or more monitor systems that execute the inspector 18. If multiple monitor systems execute the inspector 18, the inspector 18 on a given monitor system may, in some embodiments, listen for alerts from subsets of the nodes 10A–10G. While the above described embodiment has the inspector 18 and the probe agent 12 implemented in software, other embodiments may implement one or both of the inspector 18 and the probe agent 12 in hardware, or a combination of hardware and software.

As used herein, a node may include any device that is designed to be coupled to the network 14. For example, in some embodiments, the networked system may be SAN. In such embodiments, the nodes 10A–10G may comprise storage devices (e.g. disk drives, tape drives, etc.). In some embodiments, the nodes 10A–10G may also comprise switches for making various connections among the network transport links. In other embodiments, the switches may be considered to be part of the network 14. The network 14 may, for example, comprise fibre channel connections, small computer systems interface (SCSI) connections, or any other connections designed for storage devices. In other embodiments, the networked system may comprise a LAN, MAN, WAN, intranet, extranet, the Internet, or combinations thereof and the nodes may comprise computer systems coupled to the network (e.g. personal computers (PCs), workstations, servers, server appliances, etc.). The network 14 may comprise Ethernet or any other computer system networking standard.

The monitor system 12 may comprise a computer system including at least one processor configured to execute software code (e.g. the inspector 18 and/or the probe agent 16 in various embodiments), memory for temporarily storing the software code and/or data, one or more communication devices for communicating on the network 14, and optionally one or more storage devices for storing the software code and/or data. The monitor system 12 may further comprise any other desired components, in various embodiments.

As used herein, a probe may comprise one or more communications issued by the monitor system 12 to a node in order to determine if the node is experiencing a fault or other event. For example, in some embodiments, a probe may include a communication merely to determine if the node is still operating (a so-called "I'm alive" communication). In some implementations, a node may implement one or more status registers in which various event indications may be stored and/or in which operational status information may be stored, and the probe may read the status registers. In some implementations, a node may include a log file or files into which software on the node may write status (including indications of faults/events as well as, in some cases, indications of correct operation) and the probe may examine the log files. A probe may gather any information from a node which may indicate a fault on the node.

As used herein, a fault may include any event which may cause a node or nodes to either operate erroneously or cease to operate. The fault may occur on the node itself (e.g. a hardware or software failure in the node), or may occur external to the node but may affect the node's operation (e.g. a failure in the network transport used by the node, a power failure to the node, a disconnection of the node from the network, etc.).

As used herein, an alert may include any communication issued by a node to indicate an event detected by that node. For example, a node may be configured to monitor its operating temperature. If the temperature exceeds a specified maximum, the node may be prone to experience faults and may issue an alert to indicate that the temperature is exceeding the specification. Similarly, if a node implements error correction capabilities (e.g. ECC, RAID, etc.), the node may be configured to transmit an alert if the error rate detected by the node exceeds a desired error rate. In some embodiments, an alert may be a simple network management protocol (SNMP) trap, for example. In other embodiments, an alert may be an update to a log file monitored by the inspector 18.

It is noted that, in various embodiments, any number of nodes may be included in a networked system such as the system shown in FIG. 1.

Figure 2:
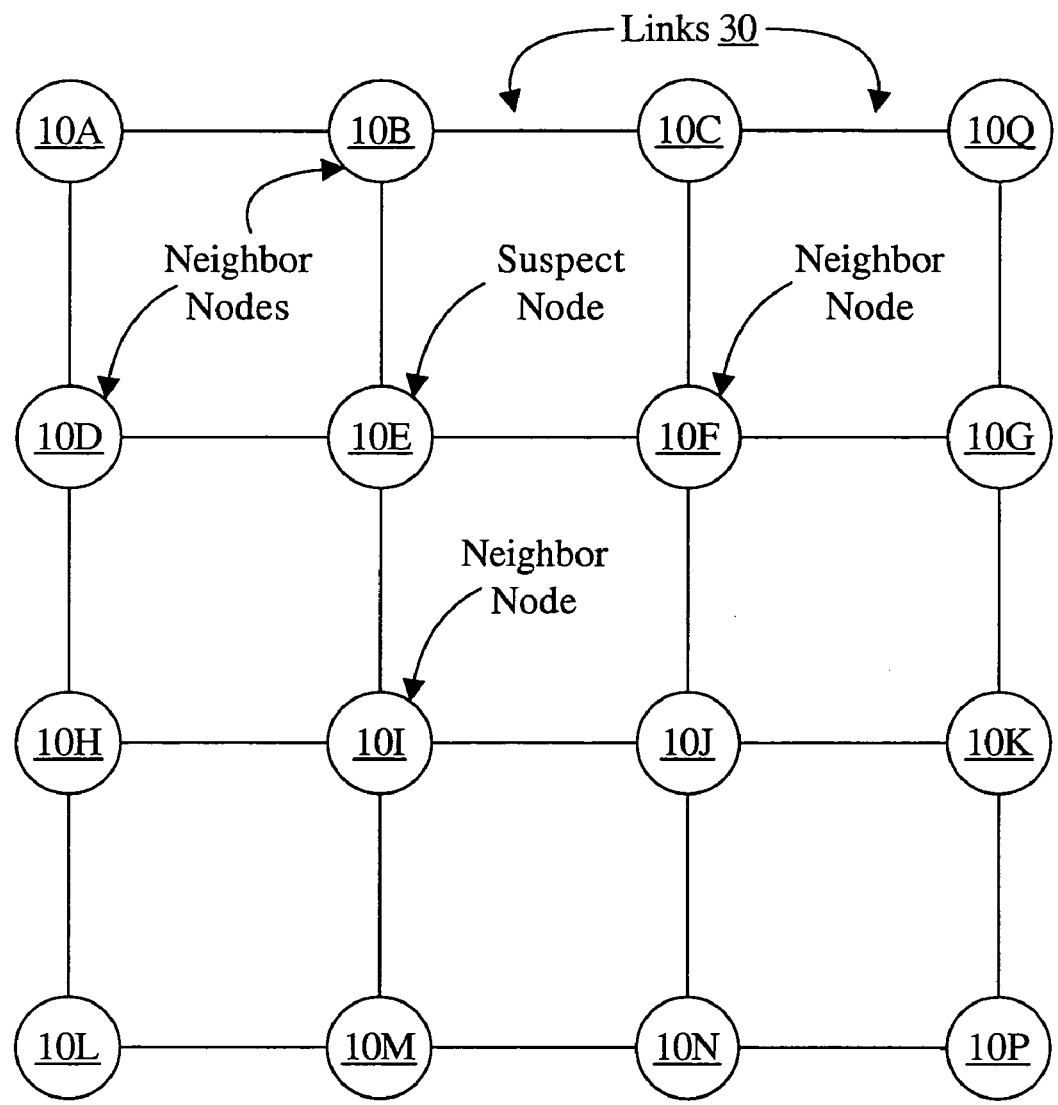
FIG. 2 is a block diagram illustrating one embodiment of various nodes and neighbor nodes linked by a relationship.

Turning now to FIG. 2, a block diagram logically illustrating various nodes 10A–10Q and logically illustrating relationships between various nodes as links 30 between the nodes 10A–10Q in FIG. 2. That is, each link between a pair of nodes represents a relationship between the pair of nodes. Any two nodes that have a link between them may be neighbor nodes of each other. A given node may have any number of relationships with any number of other nodes.

Illustrated in FIG. 2 is an example in which node 10E has been identified as a suspect node (e.g. due to node 10E transmitting an alert to the monitor system 12 or due to a probe from the monitor system 12 determining that the node 10E is experiencing a fault). Nodes 10B, 10D, 10F, and 10I have links to the node 10E, and thus are identified as neighbor nodes to the suspect node 10E.

In some embodiments, the relationships between nodes may be represented in a database on the monitor system 12, to permit identification of neighbor nodes when a suspect node is detected. In some embodiments, the database may be manually created by an administrator, for example, to reflect known relationships between nodes. In other embodiments, the database may be automatically generated by the monitor system 12, using known discovery techniques to discover relationships between the nodes. In still other embodiments, the database may be created using a combination of manual and automatic techniques. Additionally, over time, the database may be updated to reflect changes in the network (e.g. the addition or removal of nodes from the network).

A relationship between nodes (making the nodes neighbors) may be either logical or physical. For example, a set of nodes may be logically grouped in a larger logical node. For example, in a SAN, the nodes may be storage devices that are logically grouped into a volume. A fault in one of the storage devices may lead to a fault in the volume, thus affecting the volume as a whole. Physical relationships may include, for example, a resource that is shared by the nodes or physical proximity of the nodes.

Figure 6:
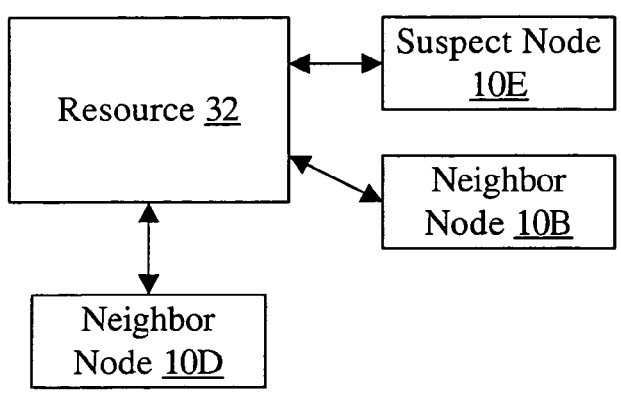
FIG. 6 is a block diagram illustrating one embodiment of a suspect node and neighbor nodes sharing a resource.

FIG. 6 illustrates an example of a shared resource 32 that may be shared by the suspect node 10E and neighbor nodes 10B and 10D. The resource may include any hardware, software, and/or data that is shared, during use, by the nodes. If an event detected by the suspect node is caused by a failure in the shared resource, then the neighbor nodes may also experience events caused by the same failure. The events may be the same type of event experienced by the suspect node, or may be different event types, or a combination thereof. For example, a shared resource 32 may be a shared network connection (e.g. a shared network transport, a shared switch in the network, etc.). If the network connection fails and causes an event in the suspect node, the neighbor nodes sharing the network connection may also experience events caused by the failed network connection. As another example, a shared resource 32 may be a shared power supply. If the power supply fails, each of the suspect node and the neighbor nodes that share the power supply may lose power.

Figure 7:
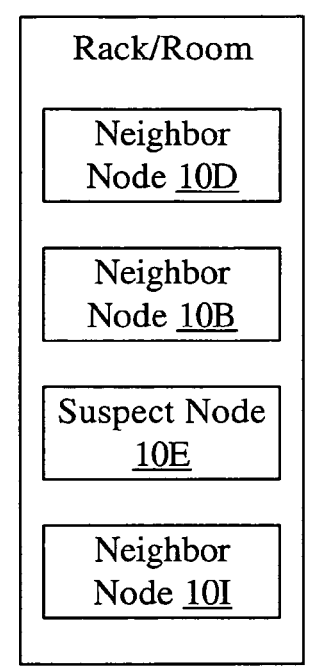
FIG. 7 is a block diagram illustrating one embodiment of a suspect node and neighboring nodes in physical proximity (e.g. in the same rack or room).

FIG. 7 illustrates an example in which the suspect node 10E and neighbor nodes 10B, 10D, and 10I have a physical proximity relationship. For example, the suspect node and neighbor nodes may be installed in the same rack (e.g. a server rack for a datacenter), located in the same room, located in the same building, etc. When the suspect node and the neighbor nodes have a physical proximity relationship, the nodes may be susceptible to faults caused by environmental factors in the proximity (e.g. power supplied to the proximity, temperature in the proximity, etc.). In some embodiments, the rack, room, etc. may be viewed as a shared resource of the suspect node and neighbor nodes as well.

While a relatively simple set of nodes and links are shown in FIG. 2, the number of relationships and nodes may be arbitrarily large and arbitrarily complex, in various embodiments.

Figure 3:
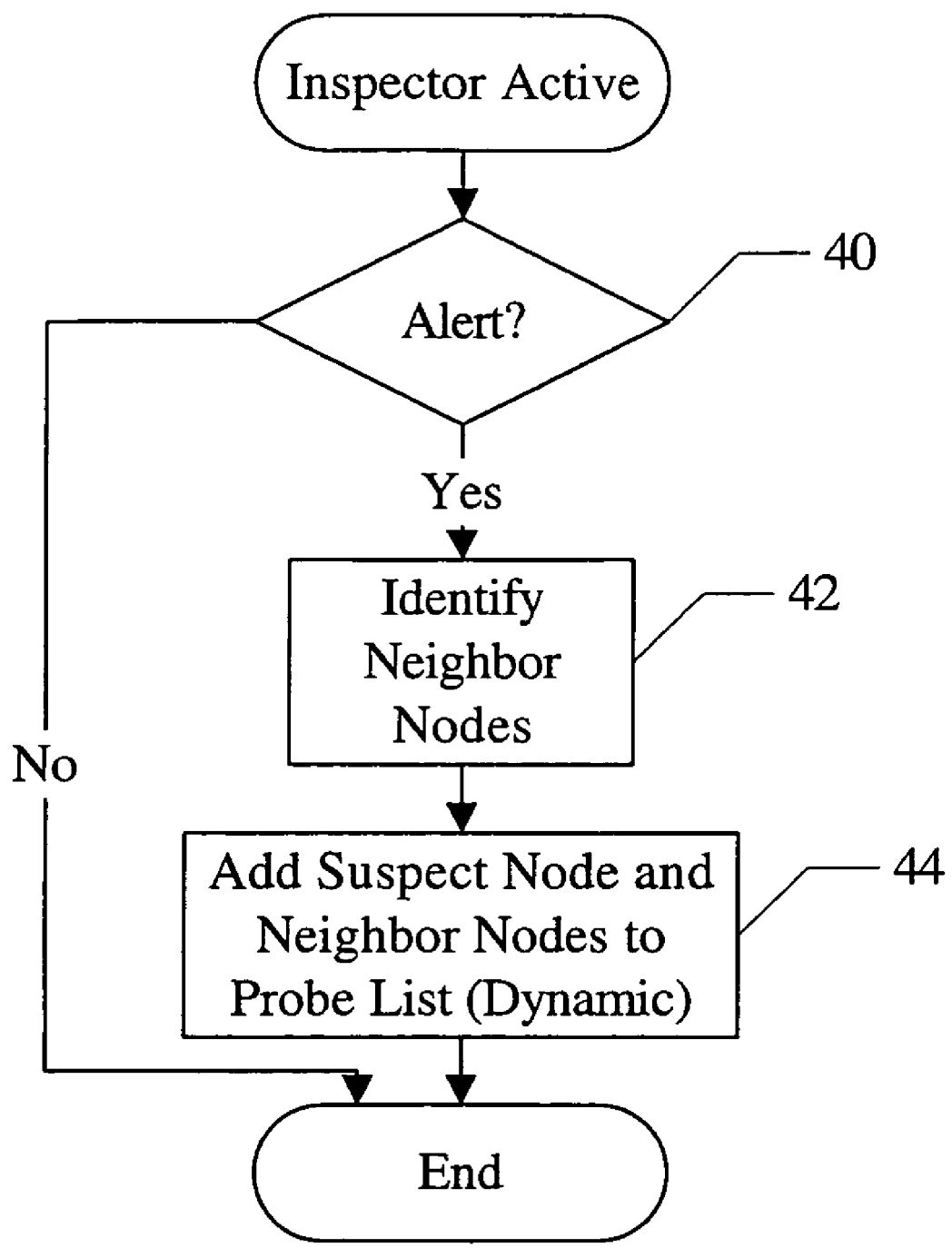
FIG. 3 is a flowchart illustrating operation of one embodiment of a inspector.

Turning now to FIG. 3, a flowchart is shown illustrating operation of one embodiment of the inspector 18. In embodiments in which the inspector 18 is implemented in software, the inspector 18 may comprise instructions which, when executed, implement the function shown in FIG. 3. If the inspector 18 is periodically scheduled, for example, the flowchart of FIG. 3 may illustrate execution in response to being scheduled. If the inspector 18 executes similar to a daemon, the flowchart of FIG. 3 may be repeatedly executed by the inspector 18.

The inspector 18 may determine if an alert has been received (decision block 40). If not (decision block 40, "no" leg), the inspector 18 is idle. If an alert has been received (decision block 40, "yes" leg), the inspector 18 may identify any neighbor nodes of the suspect node that transmitted the alert (block 42). For example, the inspector 18 may consult a database that identifies the neighbor nodes of each node, as described above with respect to FIG. 2. The inspector 18 may add the suspect node and any neighbor nodes to the probe list 20 (e.g. to the dynamic probe list 24, in the embodiment illustrated in FIG. 1) (block 44). It is noted that, in some embodiments, a given suspect node may not have any neighbor nodes.

Figure 4:
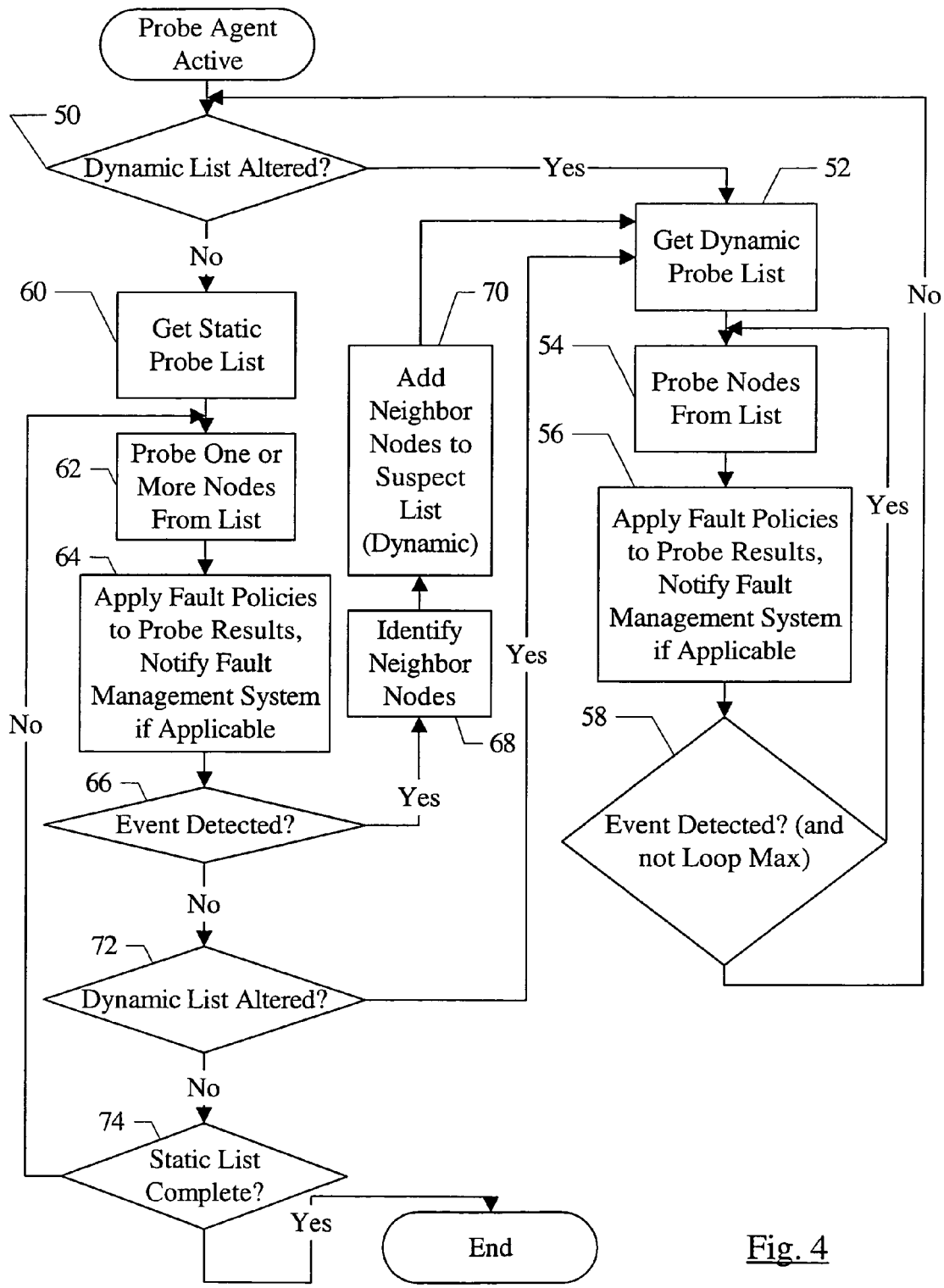
FIG. 4 is a flowchart illustrating operation of one embodiment of a probe agent.

Turning next to FIG. 4, a flowchart is shown illustrating operation of one embodiment of the probe agent 16. In embodiments in which the probe agent 16 is implemented in software, the probe agent 16 may comprise instructions which, when executed, implement the function shown in FIG. 4. The flowchart of FIG. 4 may illustrate operation of the probe agent 16 in response to one scheduling for execution, which may comprise one pass through the sequence of probing the nodes (e.g. for one pass through the static probe list 22 for the embodiment illustrated in FIG. 1) if no events are detected, or processing of the dynamic probe list 24 if one or more events have been detected.

The probe agent 16 may determine if the dynamic probe list 24 has been altered (e.g. by adding a new suspect node and/or neighbor nodes) (decision block 50). If the dynamic probe list 24 has been altered (decision block 50, "no" leg), the probe agent 16 has been scheduled to probe the suspect node and/or the neighbor nodes. The probe agent 16 may get the dynamic probe list 24 (block 52), and may probe the nodes from the dynamic list (block 54). The probe agent 16 may apply fault policies to the probe results to determine if the probe results indicate a fault, and may inform the fault management system if a fault or faults is indicated. Generally, the fault policies may comprise rules for interpreting the probe results. For example, certain events may not indicate a problem (e.g. a node going from offline to online). In some embodiments, the fault policies may include a table of events and possible root causes of that event. By matching events from the suspect node and its neighbor nodes to the table and finding common root causes from the matching entries, one or more root causes may be determined. In some embodiments, even if detected events do not identify a specific fault determinable by the probe agent 16, the probe agent 16 may still inform the fault management system of the events.

After probing the nodes in the dynamic probe list 24, the probe agent 16 may determine if at least one additional event was detected (decision block 58). If not, the probe agent 16 has completed probing the dynamic probe list 24, and may return to decision block 50 to determine if additional nodes have been added to the dynamic probe list or to revert to the static probe list 22 (and its predetermined order of all nodes) via the "no" leg of decision block 50. On the other hand, if an event is detected (decision block 58, "yes" leg), the probe agent 16 may repeat the probes of the dynamic probe list 24, since additional events are still being detected and thus it is possible that still more events may occur. The probe agent 16 may optionally also determine if a maximum number of loops through probing the dynamic probe list 24 have been executed ("and not loop max" in decision block 58). By capping the number of loops through the probes of the dynamic list 24, the probe agent 16 may ensure that it exits the dynamic probe list 24 and reverts to the static probe list 22 even if events continue to occur in the suspect node and its neighbor nodes for a relatively long period of time. In other embodiments, no cap to the number of loops may be implemented. If the maximum number of loops has occurred, the probe agent 16 return to decision block 50, as mentioned above, even if additional events were detected in the most recent probing of the nodes in the dynamic probe list 24 (decision block 58, "no" leg). If the maximum number of loops has not occurred (and additional events were detected in the most recent probing—decision block 58, "no" leg), the probe agent 16 may return to block 54 and probe the nodes from the dynamic probe list 24 again.

Returning to decision block 50 in the flowchart of FIG. 4, if the dynamic probe list 24 has not been altered (decision block 50, "no" leg), the probe agent 16 may get the static probe list 22 (block 60). In some embodiments, the number of nodes in the networked system may be large and the probe agent 16 may be configured to probe a subset of the nodes from the static list at a time (block 62). In this fashion, if an alert is detected while the probe agent 16 is probing according to the sequence, the probing may be interrupted to probe the suspect node and neighbor nodes. The probe agent 16 may apply the fault policies to the probe results and notify the fault management system if applicable, similar to block 56 (block 64).

If an event is detected in a suspect node as a result of probing the nodes in the static probe list (decision block 66, "yes" leg), the probe agent 16 may identify the neighbor nodes of the suspect node (block 68) similar to the inspector 18, and may update the dynamic probe list 24 with the neighbor nodes (block 70). The probe agent 16 may proceed (block 52) with probing the nodes in the dynamic probe list, thus interrupting the static probing according to the predetermined order. If an event is not detected (decision block 66, "no" leg), the probe agent 16 may again check if the dynamic probe list 24 has been altered (e.g. by the inspector 18) (decision block 72). If the dynamic probe list 24 has been altered (decision block 72, "yes" leg), the probe agent 16 may proceed (block 52) with probing the nodes in the dynamic probe list, thus interrupting the static probing according to the predetermined order.

If no event is detected (decision block 66, "no" leg) and no alteration of the dynamic probe list 24 is detected (decision block 72, "no" leg), the probe agent 16 may determine if the current pass through the static probe list 22 is complete (decision block 74). If so (decision block 74, "yes" leg), the probe agent 16 may exit and await rescheduling. If not, (decision block 74, "no" leg), the probe agent 16 may return to block 62 and probe the next subset of nodes from the static probe list 22.

Figure 5:
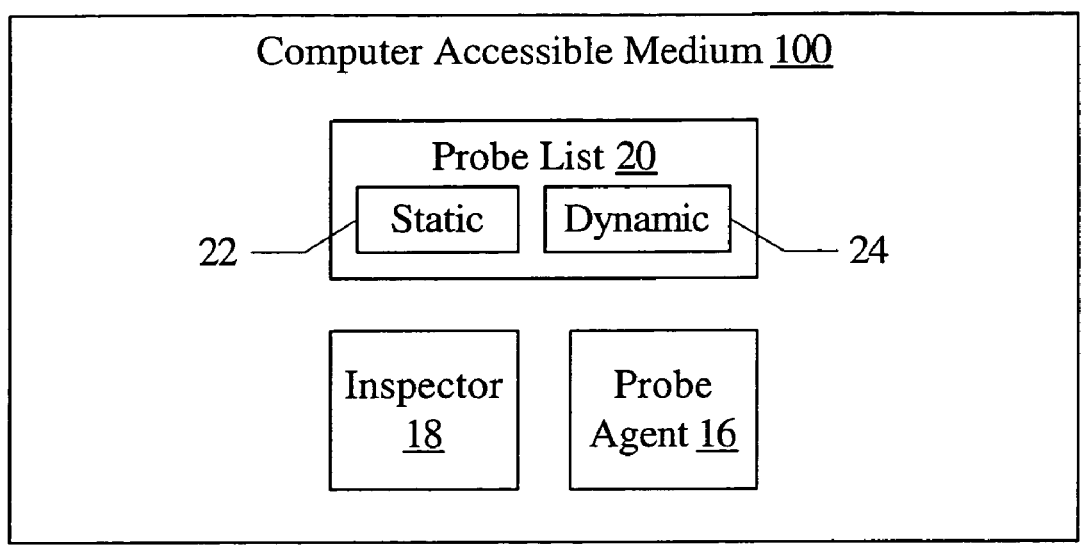
FIG. 5 is a block diagram of one embodiment of a computer accessible medium.

Turning now to FIG. 5, a block diagram of a computer accessible medium 100 is shown. Generally speaking, a computer accessible medium may include any media accessible by a computer during use to provide instructions and/or data to the computer. For example, a computer accessible medium may include storage media such as magnetic or optical media, e.g., disk (fixed or removable), tape drives, compact disk-ROM (CD-ROM), or digital versatile disk-ROM (DVD-ROM), CD-Recordable (CD-R), CD-Rewritable (CD-RW), DVD-R, DVD-RW, volatile or non-volatile memory media such as RAM (e.g. synchronous dynamic RAM (SDRAM), Rambus DRAM (RDRAM), static RAM (SRAM), etc.), ROM, etc., as well as media accessible via transmission media or signals such as electrical, electromagnetic, or digital signals, conveyed via a communication medium such as a network and/or a wireless link. The computer accessible medium 100 in FIG. 5 may be encoded with the inspector 18, the probe agent 16, and/or the probe list 20 (including the static probe list 22 and the dynamic probe list 24, in some embodiments). Generally, the computer accessible medium 100 may store any set of instructions which, when executed, implement a portion or all of the flowcharts shown in one or more of FIGS. 3 and 4.

Numerous variations and modifications will become apparent to those skilled in the art once the above disclosure is fully appreciated. It is intended that the following claims be interpreted to embrace all such variations and modifications.

What is claimed is:

1. A computer accessible medium comprising a plurality of instructions which, when executed:
   probe nodes in a network to determine if one or more nodes are experiencing any events indicative of one or more faults, wherein nodes are probed in a sequence; and
   in response to receiving a first alert transmitted by a first node in the network, wherein the first node is configured to transmit the first alert in response to the first node detecting an event and independent of the probes performed according to the sequence and asynchronous to the probes performed according to the sequence, probe one or more neighbor nodes of the first node.

2. The computer accessible medium as recited in claim 1 wherein the plurality of instructions, when executed, further probe the first node in response to receiving the first alert.

3. The computer accessible medium as recited in claim 1 wherein the plurality of instructions, when executed, further revert to probing according to the sequence subsequent to probing the one or more neighbor nodes.

4. A computer accessible medium comprising a plurality of instructions which, when executed:
   probe nodes in a network to determine if one or more nodes are experiencing one or more events indicative of one or more faults, wherein nodes are probed in a sequence; and
   in response to receiving a first alert transmitted by a first node in the network asynchronous to the probes performed according to the sequence, interrupt probing according to the sequence to probe at least the first node.

5. The computer accessible medium as recited in claim 4 wherein the instructions, when executed, further probe one or more neighbor nodes to the first node in response to the first alert and independent of the sequence.

6. The computer accessible medium as recited in claim 4 wherein the instructions, when executed, revert to probing according to the sequence subsequent to probing the first node.

7. A computer system comprising a probe agent and an inspector, wherein the probe agent is configured to probe nodes in a network in a sequence to determine if the nodes are experiencing an event or events indicative of one or more faults, and wherein the inspector is configured, in response to receiving a first alert transmitted by a first node in the network asynchronous to the probing by the probe agent, to identify one or more neighbor nodes of the first node and to cause the probe agent to probe the one or more neighbor nodes independent of the sequence.

8. The computer system as recited in claim 7 wherein the inspector is further configured to cause the probe agent to probe the first node independent of the sequence.

9. The computer system as recited in claim 7 wherein the sequence is specified in a probe list, and wherein the inspector is configured to update the probe list with the one or more neighbor nodes to cause the probe agent to probe the one or more neighbor nodes.

10. The computer system as recited in claim 7 wherein the first node and the neighbor nodes share at least one resource.

11. The computer system as recited in claim 10 wherein the resource comprises at least one of a network connection, a power supply, a rack that holds the first node and the neighbor nodes, and a room in which the first node and the neighbor nodes are physically located.

12. A method comprising:
   probing nodes in a network to determine if one or more nodes are experiencing one or more events indicative of one or more faults, wherein nodes are probed in a predetermined sequence;
   receiving a first alert transmitted by a first node in the network asynchronous to the probing and independent of the probing, wherein the first node is configured to transmit the first alert in response to the first node detecting an event and independent of the probes performed according to the sequence; and
   in response to receiving the first alert, probing one or more neighbor nodes of the first node.

13. The method as recited in claim 12 further comprising probing the first node in response to receiving the first alert.

14. The method as recited in claim 12 further comprising reverting to probing according to the predetermined sequence subsequent to probing the one or more neighbor nodes.

15. An apparatus comprising:
   a plurality of nodes; and
   a computer system coupled to the plurality of nodes, wherein the computer system is configured to probe the plurality of nodes in a sequence to determine if one or more nodes are experiencing one or more faults or one or more events indicative of one or more faults;
   and wherein at least a first node is configured to transmit a first alert to the computer system asynchronous to the probing, and wherein the computer system, in response to the first alert, is configured to probe one or more neighbor nodes of the first node independent of the sequence.

16. The apparatus as recited in claim 15 wherein the computer system is further configured to probe the first node responsive to the first alert.

17. The apparatus as recited in claim 15 wherein the plurality of nodes comprise at least one of: storage devices in a storage area network, and computer systems coupled to a network.

18. The apparatus as recited in claim 15 wherein the first node and the neighbor nodes share at least one resource.

19. The apparatus as recited in claim 18 wherein the resource comprises at least one of a network connection, a power supply, a rack that holds the first node and the neighbor nodes, and a room in which the first node and the neighbor nodes are physically located.

* * * * *